J. C. JENKINS.
CARRIAGE-AXLE.
No. 172,322. Patented Jan. 18, 1876.
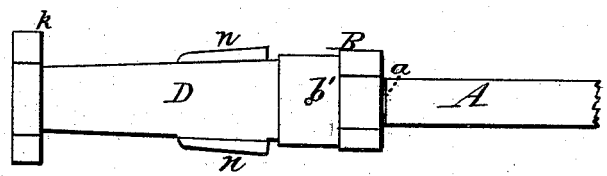
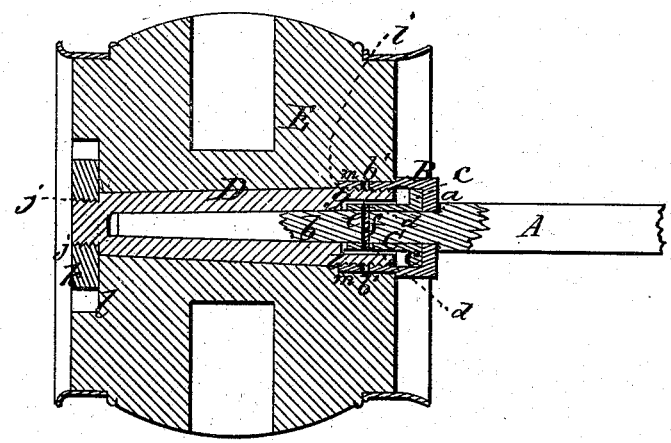
Witnesses:
J. P. Theodore Lang.
Jno. P. Slater.
Inventor:
Joseph C. Jenkins
by
Mason Fenwick Lawrence
Attys.

UNITED STATES PATENT OFFICE.

JOSEPH C. JENKINS, OF LEBANON, TENNESSEE.

IMPROVEMENT IN CARRIAGE-AXLES.

Specification forming part of Letters Patent No. 172,322, dated January 18, 1876; application filed December 11, 1875.

*To all whom it may concern:*

Be it known that I, JOSEPH C. JENKINS, of Lebanon, in the county of Wilson and State of Tennessee, have invented a new and useful Improvement in Carriage-Axles and Hub-Boxes; and I do hereby declare that the following is a full, clear, and exact description of the same, reference being had to the accompanying drawings forming part of this specification, in which—

Figure 1 is a top view of my improved axle and hub-box. Fig. 2 is a central longitudinal section of the axle, axle-box, and a hub constructed and united together in accordance with my invention.

The nature of my invention consists, first, in the combination, with an axle constructed with arms or spindles which extend out from shoulders on the axle, of sleeves with collars made separate from the axle, and fastened to the axle-arms by a removable pin, and of revolving box-nuts perforated vertically, and confined between the shoulders of the axle and the collars of the sleeves, whereby the nuts form grease-boxes and sand-excluders at the inner ends of the hubs, and facilities are afforded for turning the collars round after they become worn out of a true circle on the bearing side, or of supplying new collars at slight cost.

It consists, secondly, in a tapered axle-box, closed on its outer end, and having narrow feathers or wings on its periphery, and screw-threads on its inner and outer ends, in combination with a wooden hub driven upon the box, and constructed with recesses to admit the inner and outer fastening-nuts upon the screw-threaded portions of the box, with an axle provided with a collar fastened by a removable pin, and which can be shifted when it becomes worn, and a vertically-perforated box-nut, which revolves between the shoulder of the axle and said collar, whereby the hub can be applied to the axle in a very convenient and permanent manner without requiring to be cut away to any great extent in order to make it secure, and when applied will retain its lubricating oil, and have sand excluded therefrom, and, in case of necessity, can be removed from the axle by simply unscrewing the nut on the outer end of the axle-arm, and when removed the collar of the axle can be unfastened and turned around as far as required, in order to bring a circular bearing part on the underside of the spindle of the axle; or, if the collar is worn out, a new one can be conveniently supplied in its place at very slight cost.

To enable others skilled in the art to make and use my invention, I will proceed to describe the same with reference to the drawings.

A is the axle, and $a$ a shoulder, and $b$ an arm or spindle thereon. Through the spindle a hole, $e$, is bored to receive a fastening-pin, as presently described. B is a long box-nut, made open its full diameter at its outer end, and closed at its inner end, except a passage through it at said inner end equal to the largest diameter of the spindle $b$. Through the nut from side to side a transverse passage, $b'$, is formed, for a purpose presently described. This nut is slipped upon the axle-arm, and bears against the shoulder $a$ of the axle. C is a sleeve, with a collar, $c$, formed on its inner end. Through the sleeve a transverse passage, $d$, corresponding to the passage $b'$ of the nut, is bored from side to side. This sleeve is slipped over the spindle $b$, and made to bear against the boxed end of the nut, and is confined by a pin, $f$, passed through it and the spindle, as shown. D is a metal hub-box of taper form, and closed at its outer and open at its inner end, and provided with narrow feathers or wings $n\ n$ on its periphery. This box is bored to receive the spindle $b$, and has a counterbore, $g$, at its inner end to receive the sleeve C. On the inner and outer ends of the box screw-threads $i$ and $j$, for nuts to screw upon, are cut, as shown. Upon the inner thread $i$ the box-nut B is screwed, and on the outer thread a nut, $k$, is screwed; but before these nuts are screwed upon these screw-threads a wooden hub, E, constructed with recesses $l\ m$ to admit the nuts, is driven upon the tapered box, as shown in Fig. 2.

In case the hub is of metal, and constructed according to some of the well-known plans now in use, the nuts B and $k$ will be screwed upon extensions of the hub or parts of the hub.

From the drawings, it will be seen that the transverse passage $b'$ through the nut B is in the same vertical plane with the pin $f$, which confines the sleeve and its collar to the spindle, and therefore, when it is desired to unfasten the sleeve C, with collar $c$ attached, it is only necessary to run the hub E off the spindle, turn the passage of the box-nut in line with the pin $f$, and drive out the pin with a proper instrument. This done, the collar can be turned half around, and again fastened with the pin, or it can be removed and another substituted for it and fastened by the pin.

Having thus described my invention, what I claim as new, and desire to secure by Letters Patent is—

1. The combination of the box-nut B, with transverse passages $b'$ through it, the perforated sleeve C and its collar $c$, fastened in place by a removable pin, $f$, and the shouldered axle A, with perforated spindle $b$, substantially as and for the purpose described.

2. The hub-box D, of taper form, and constructed with wings $n\ n$ on its periphery, and screw-threads $i\ j$ on its ends, and with a counterbore, $g$, at its inner end, in combination with a wooden hub, E, constructed with recesses $l\ m$, to admit fastening-nuts B and $k$, and with an axle, A, provided with a removable sleeve, C, and collar $c$, and a revolving box-nut, B, substantially as described.

Witness my hand in matter of my application for a patent for improvement in carriage-axles.

JOSEPH C. JENKINS.

Witnesses:
   E. J. MIDDLETON, Jr.,
   J. S. SLATER.